United States Patent [19]
Finch et al.

[11] Patent Number: 5,299,760
[45] Date of Patent: Apr. 5, 1994

[54] S-DUCT FOR A TURBO-JET AIRCRAFT ENGINE

[75] Inventors: Thomas E. Finch, Spring Branch; Enrico Cavatorta, San Antonio; William Paschal, Schertz, all of Tex.

[73] Assignee: The Dee Howard Company, San Antonio, Tex.

[21] Appl. No.: 909,771

[22] Filed: Jul. 7, 1992

[51] Int. Cl.⁵ .......................... B64D 33/02
[52] U.S. Cl. ..................... 244/53 B; 244/55
[58] Field of Search ............. 244/53 R, 53 B, 55

[56] References Cited

U.S. PATENT DOCUMENTS

| | | |
|---|---|---|
| 3,042,342 | 7/1962 | Wiles et al. |
| 3,109,610 | 11/1963 | Quenzler et al. |
| 3,122,343 | 2/1964 | Leibach et al. |
| 3,127,132 | 3/1964 | Grady |
| 3,132,827 | 5/1964 | Roy et al. |
| 3,215,369 | 11/1965 | Johnson |
| 3,237,891 | 3/1966 | Wofton ............................ 244/55 |
| 3,469,803 | 9/1969 | Schmielau |
| 3,666,211 | 5/1972 | Cathers et al. ................. 244/55 |
| 4,787,421 | 11/1988 | Yu |
| 4,901,947 | 2/1990 | Raymer |
| 4,989,807 | 2/1991 | Foreman et al. |

Primary Examiner—Galen Barefoot
Attorney, Agent, or Firm—Cox & Smith Incorporated

[57] ABSTRACT

An improved S-duct for turbo-jet engined aircraft. The present invention allows a high volume of high energy air to traverse the S-duct at a high pressure recovery ratio.

8 Claims, 8 Drawing Sheets

S-DUCT FOR A TURBO-JET AIRCRAFT ENGINE

BACKGROUND OF THE INVENTION

1. Field of Invention

The present invention relates to a new and improved S-duct for supplying air to a turbojet aircraft engine located within the fuselage of the aircraft. The S-duct of the present invention allows a high volume of high energy subsonic air to traverse the S-duct at a high pressure recovery ratio.

2. Background Description

S-duct technology is old in the art. Boeing Commercial Airplane Company was one of the original and principal developers of S-Duct technology in the early 1970's to supply air to a turbo jet engine mounted in the rear end of the fuselage for the well known 727 aircraft. During this early period Boeing developed an S-duct for the Pratt & Whitney JT8D engine.

This particular S-duct was somewhat successful. Boeing found that not all JT8D engines would work with all S-ducts. Engines would have to be selected for a high surge factor for placement as the aft engine, supplied by a conventional S-duct. Boeing's S-duct was also limited in the volume of high energy air that would actually traverse the longitudinal length of the S-duct and appear at the engine fan.

The high energy air flow problem was addressed by Boeing in later versions of the S-duct. Boeing's S-duct technology dictated that more air flow from a larger diameter S-duct would solve the high energy air flow problem. However, to Boeing's dismay the larger inlet to the S-duct did not result in more high energy air reaching the engine fan. The principal reason for this failure is that the larger the inlet, the slower the air moves in the duct, therefore less high energy air reaches the engine fan.

Present S-duct technology has many limitations, most of which are limitations imposed by the aircraft structure in the vicinity, of an S-duct for an aft engine. An example of such limitation is the Boeing 727 aircraft. The S-duct of that aircraft must traverse the rear pressure bulkhead and pass unobstructingly through a fixed dimensioned aperture in the front spar forging of the vertical tail fin on its way to the aft engine. Other limitations are Federal Aeronautics Administration (FAA) and the International Civil Aviation Organization (ICAO) increasing requirements for engine noise abatement in and around airports. These restrictions have performance penalties associated with them. These penalties may be overcome by using a much quieter and efficient engine, such as the Rolls Royce Tay 650 or 670 model engine.

The Tay series engine by Rolls Royce requires 30% more air flow than the JT8D engine by Pratt Whitney. That increase in air flow, according to present S-duct technology, would dictate a 30% larger S-duct. However, not many current aircraft have a fuselage that will support a 30% increase in S-duct size.

Therefore, due to aircraft structural limitations, governmental restrictions, and limited S-duct technology, a more efficient and quiet aircraft engine utilizing a S-duct is a longfelt but unresolved need in the aircraft industry.

Other objects, advantages and features of the present; invention will become apparent to those skilled in the art from the following discussion.

SUMMARY OF THE INVENTION

The present invention will allow modern aircraft engines to be installed on existing aircraft requiring an S-duct, such as the Boeing 727 aircraft. The preferred embodiment of the present invention that enables such an installation is: the cross-sectional area of the S-duct will vary according to the chosen aircraft's structural limitations; and the desired volume of high energy air ingested by the S-duct which is related to the velocity of the air that is turned by the internal structural bends of the S-duct. The Boeing 727 aircraft is an example of an aircraft that can be re-engined from a JT8D to a Tay 650 or 670 Rolls-Royce engine utilizing an S-duct emodying the present invention.

The S-duct required for that re-engining would have a configuration varying from an enlarged circular cross-sectional area at the forward open end of the air flow inlet to a first elliptical transitional area which has an increasingly reduced cross-sectional area as it approaches the main spar forging of the vertical fin of the aircraft. Forward of the main spar the S-duct's outer shell is in close proximity to the aft air pressure bulkhead. The S-duct is elliptical shaped as it passes unobstructively through the aperture of the main spar. A second transitional section is provided rearwardly adjacent to the reduced cross-sectional area portion and has an increasing cross-sectional area and a circular cross-section as it approaches the engine intake fan. After traversing the rear pressure bulkhead and the main spar forging of the vertical fin, the S-duct is sealingly connected to the engine cowling which encloses the engine fan.

The volume of high energy air that is ingested by the S-duct must be turned by the double -S- type bend of the duct on its way to the engine fan. The engine and fan are disposed within the aft portion of the aircraft fuselage and the axis of the forward circular end of the S-duct is vertically above the center line axis of the engine. The turning of the air was accomplished in the original 727 S-duct at lower velocities in an attempt to reduce boundary layer separation, but this called for a larger cross-section and resulted in more abrupt turns, and an unfavorable pressure gradient. The S-duct configuration of the present invention allows for increasing of the radii of curvature over previous designs and an area profile to accelerate the flow at the proper point in the curve to achieve the proper pressure gradient which maintains the required attached airflow, thereby maintaining a consistent velocity of high energy air presented over the entire engine fan disc.

Another feature of the present invention is the utilization of, an interdependent relationship between a selectable Mach number profile, cross-sectional area of the S-duct, and the radii of curvature of the double bend of the S-duct. By selecting the correct Mach number profile in concert with defining the radius of curvature made possible by the cross-sectional area adjustments, a method becomes possible to design a duct which maintains attached flow.

The Mach number profile is the velocity of the air flow along the longitudinal center line of the S-duct from the air inlet end to the air exit into the engine fan and is selectable relative to the desired volume of air flow passing any chosen point of the S-duct. The Mach number profile identifies the velocity of air flow measured at the speed of sound multiplied by scaling factor. An example is: a desired Mach number profile of 0.35 identifies the velocity of the flow at a particular point in the S-duct to be 0.35 multiplied by the speed of sound. The velocity of the air through the S-duct is dependent on the cross-section area of the duct. Local velocities are affected by the radii of curvature of the leading and trailing bends of the duct.

The total air flow velocity, the first or forward bend of the S-duct, is determined by the cross-sectional area at that particular portion of the S-duct, however local velocity can be affected by the radius of curvature of that particular bend of the S-duct unless the pressure gradient is correct. The present invention allows for a selectable Mach number profile and that will provide a continuous high energy air flow around the first bend of the S-duct while generating a favorable pressure gradient in the vicinity of the first bend of the S-duct.

The air flow velocity turned by the second or rear bend of the S-duct, is determined by the cross-sectional area at that particular portion of the S-duct and the radius of curvature of that particular bend of the S-duct. The present invention allows for a selectable radius of curvature that will provide a continuous high energy air flow around the second bend of the S-duct.

The selectivity of the radius of curvature of both leading and trailing bends of the S-duct is interdependent with the Mach number profile selected for an adequate cross-sectional area that will provide an adequate volume of high energy air to the engine fan. This selection of a correct Mach number profile is dependent on the largest cross-section area of S-duct that will pass through the main spar of the vertical fin. Therefore, once the type of aircraft is chosen and the structural limitations are identified, the present invention may be utilized as follows: the Mach number profile is selected to provide the correct pressure gradient to the airflow past any given point in the S-duct; the elliptical cross-sectional area of the S-duct is varied as required by structural limitations and to aid in the flow of high energy air; the inlet centerline location and duct area profile is selected to allow an increase in the radii of curvature in both forward and rear bends of the S-duct which reduces the distortion in the flow of said high energy air to the engine's intake fan.

A more complete appreciation of the invention and many of the attendant advantages thereof will be readily perceived as the same becomes better understood by reference to the following detailed description when considered in connection with the following drawings.

DETAILED DESCRIPTION

Figure 1:
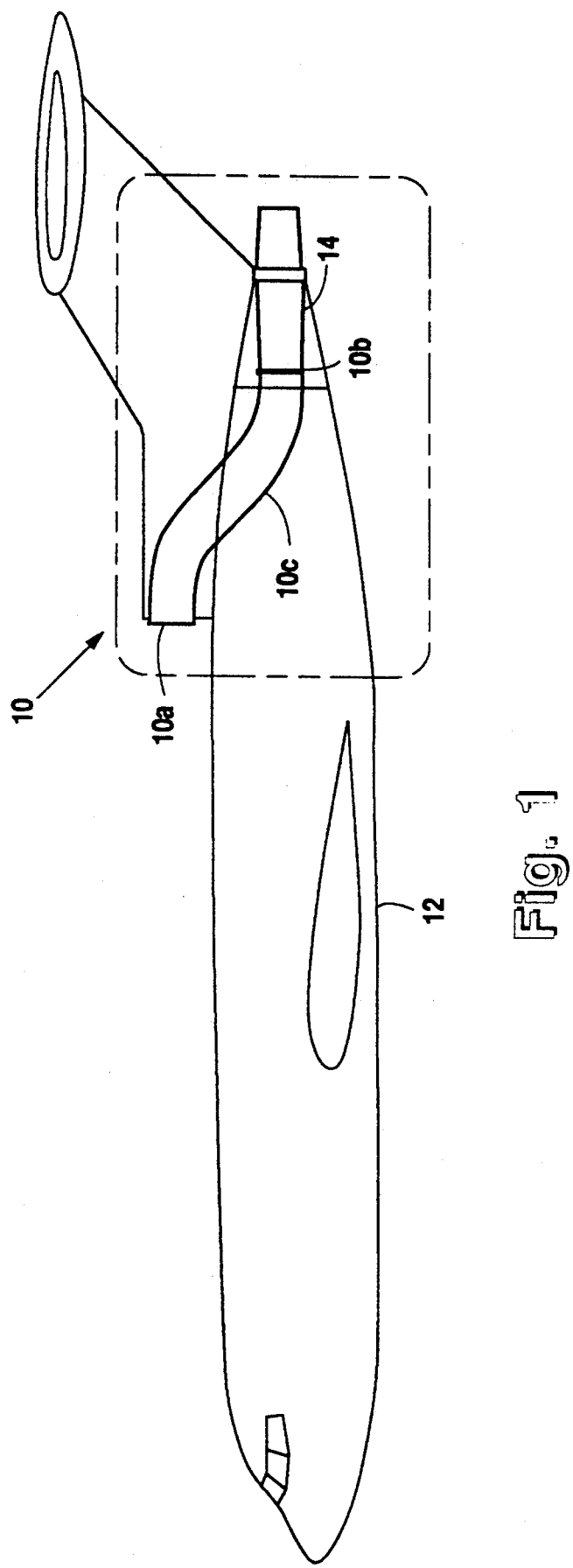
FIG. 1 is a schematic environmental illustration of the S-duct.
Figure 2:
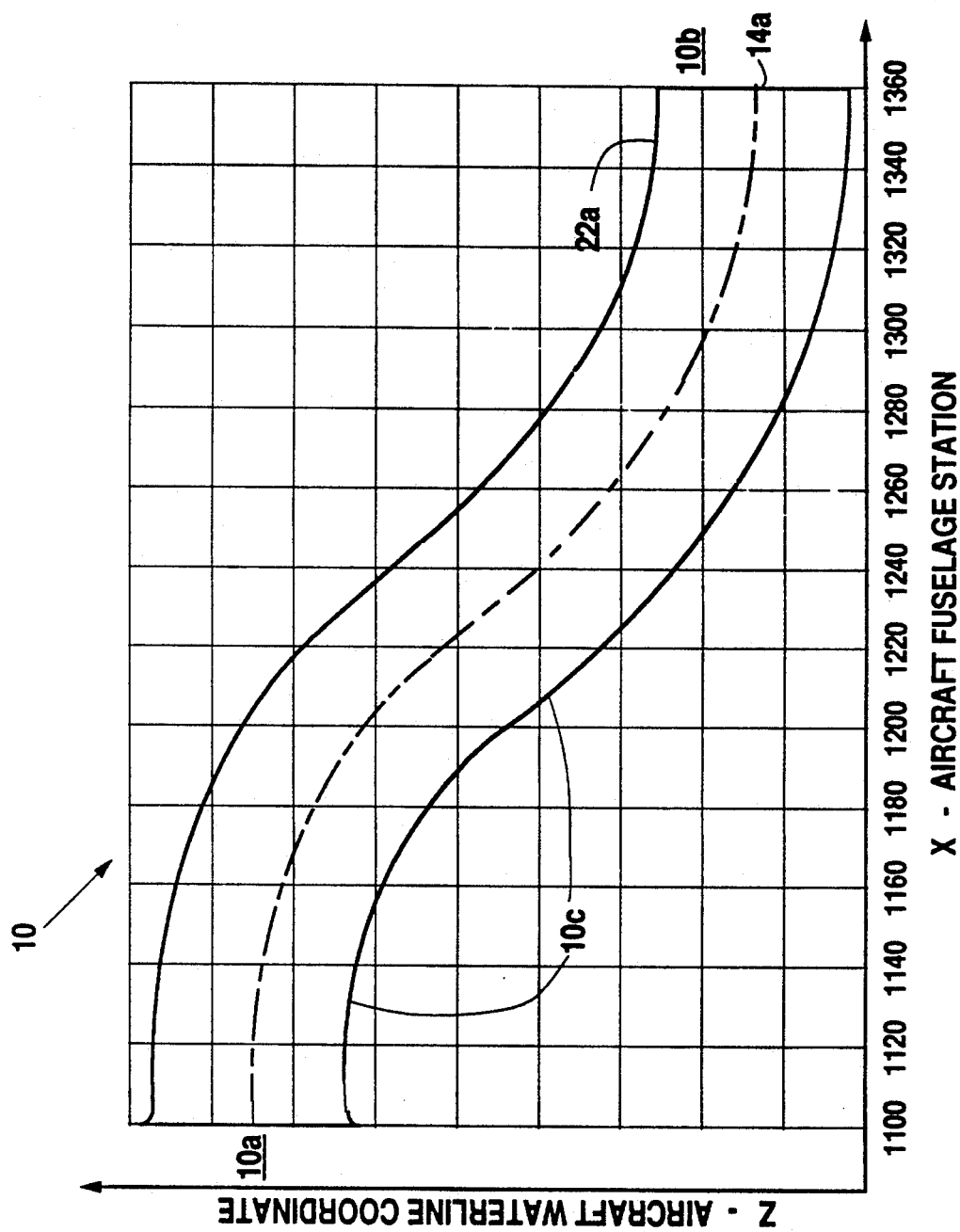
FIG. 2 is a graphical profile vertical sectional view of the S-duct embodying this invention.

Referring to FIGS. 1 and 2, the S-duct constituting a preferred embodiment of the present invention is shown generally at 10. The duct 10 is mounted onto a turbojet aircraft 12 that requires an S-duct 10 to provide air flow for an aft mounted turbo-jet engine 14. The S-duct 10 comprises a circular air entering opening inlet end 10a, a circular air exiting end 10b, and a medial S-shaped portion 10c connecting 10a and 10b. The open inlet end 10a is located substantially above and forward of the turbo-jet engine 14 and, is positioned with its axis at an upwardly directed angle in a vertical plane relative to the horizontal axis of the aircraft's engine 14.

Figure 3:
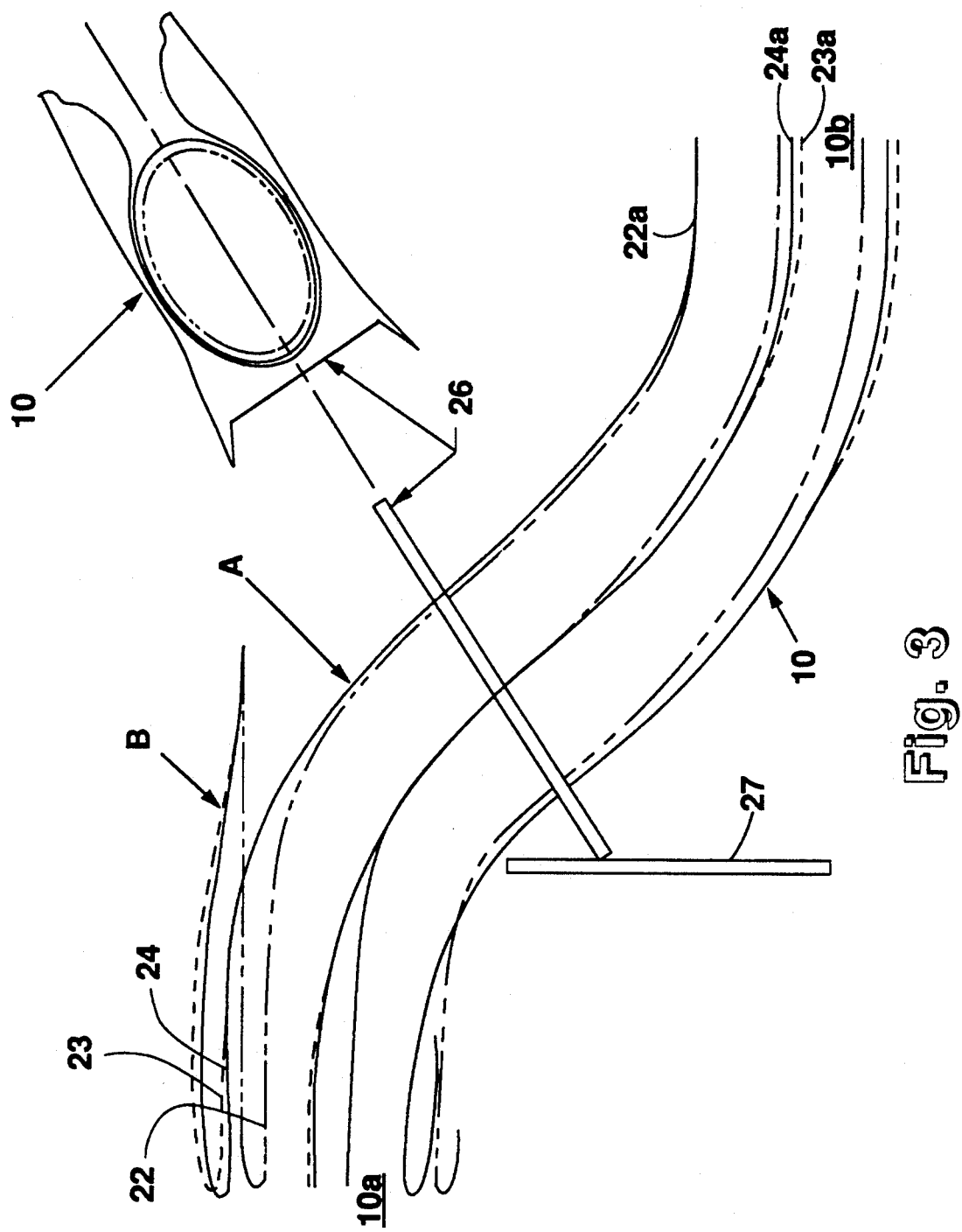
FIG. 3 is a schematic sectional view of the present invention as compared to the original S-duct construction.
Figure 4:
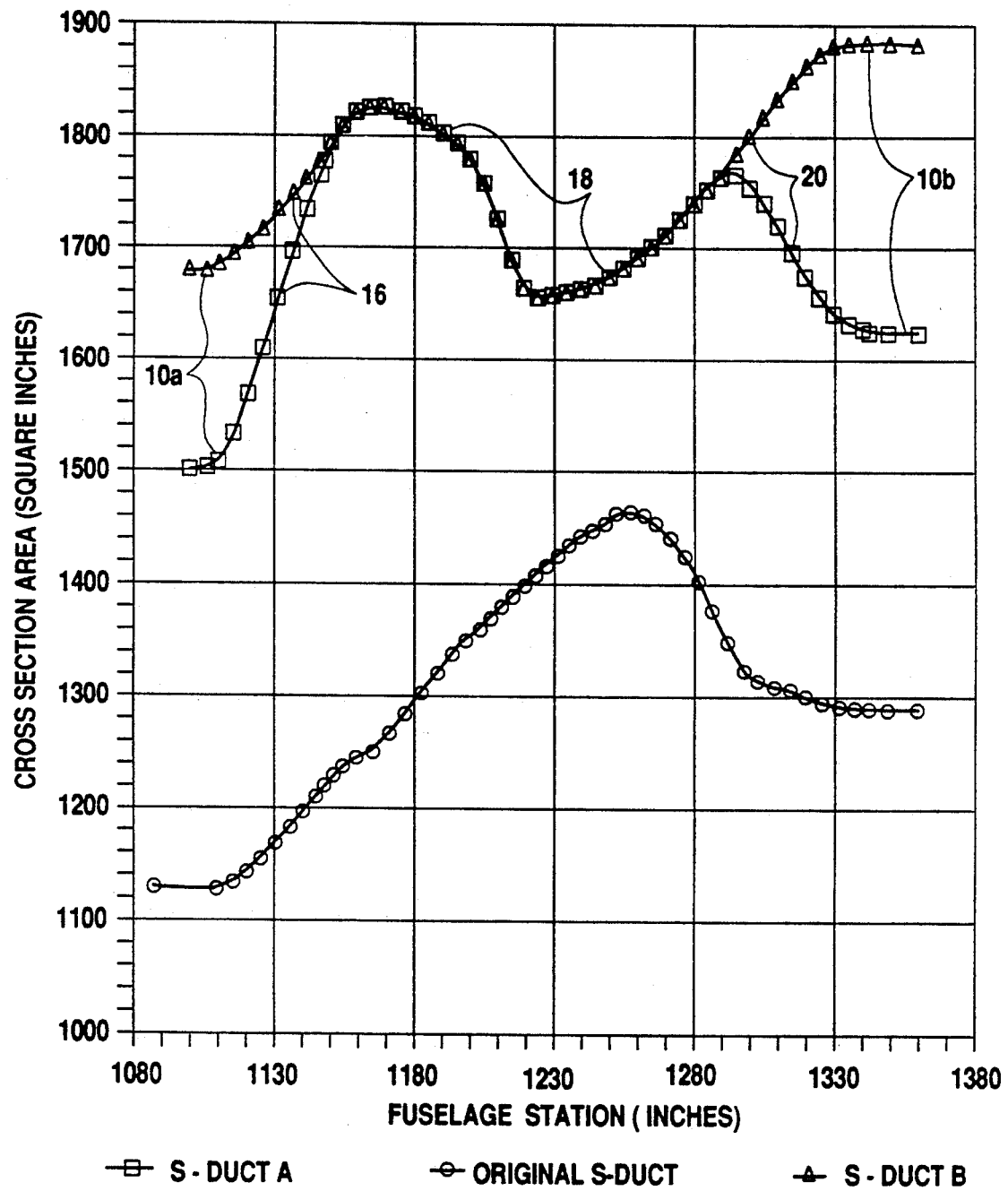
FIG. 4 is a graph showing the cross-sectional area of the new S-duct and cross-sectional area of the original S-duct construction.
Figure 5:
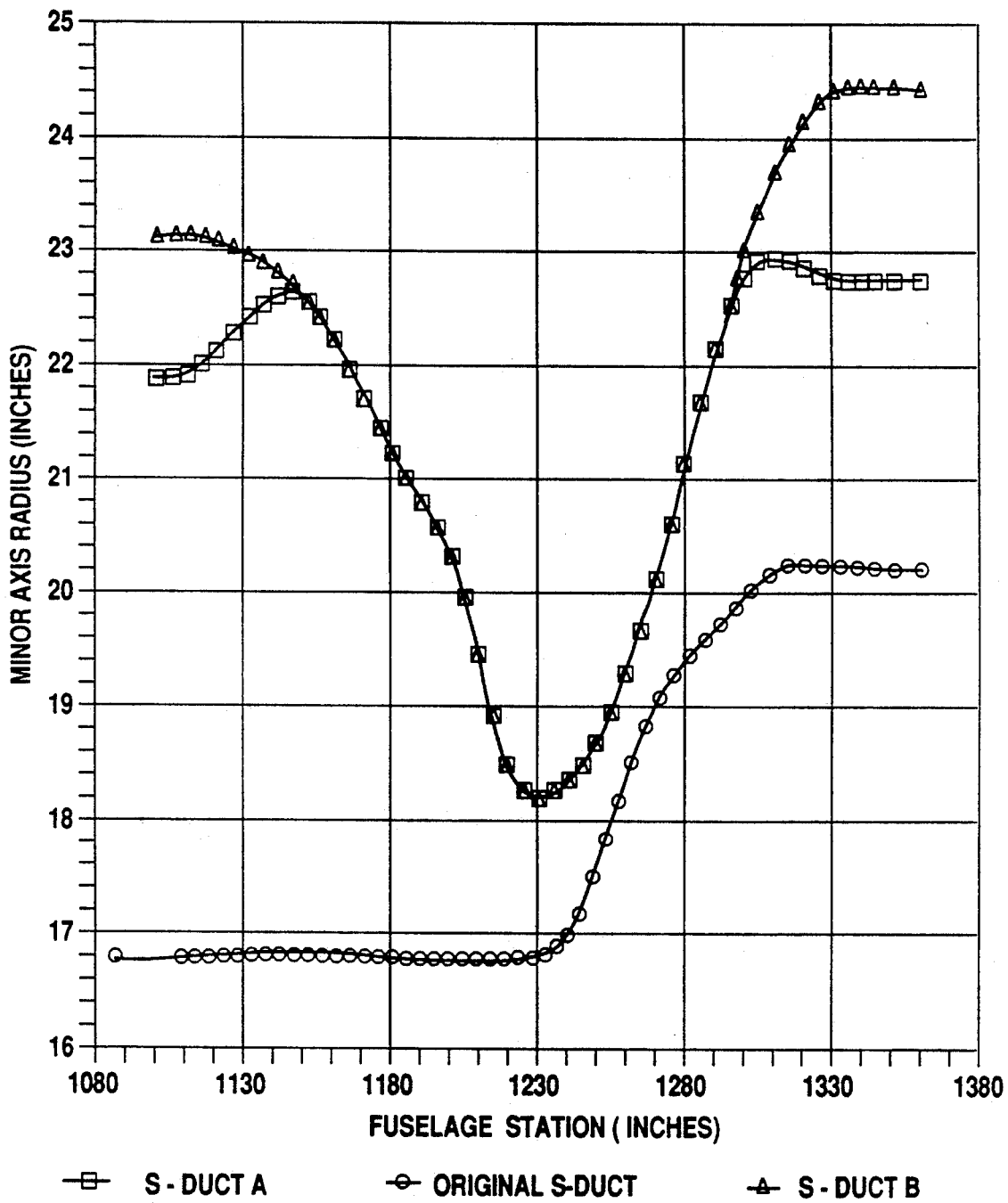
FIG. 5 is a graph showing the minor axis of the new S-duct and the minor axis of the original S-duct construction.
Figure 6:
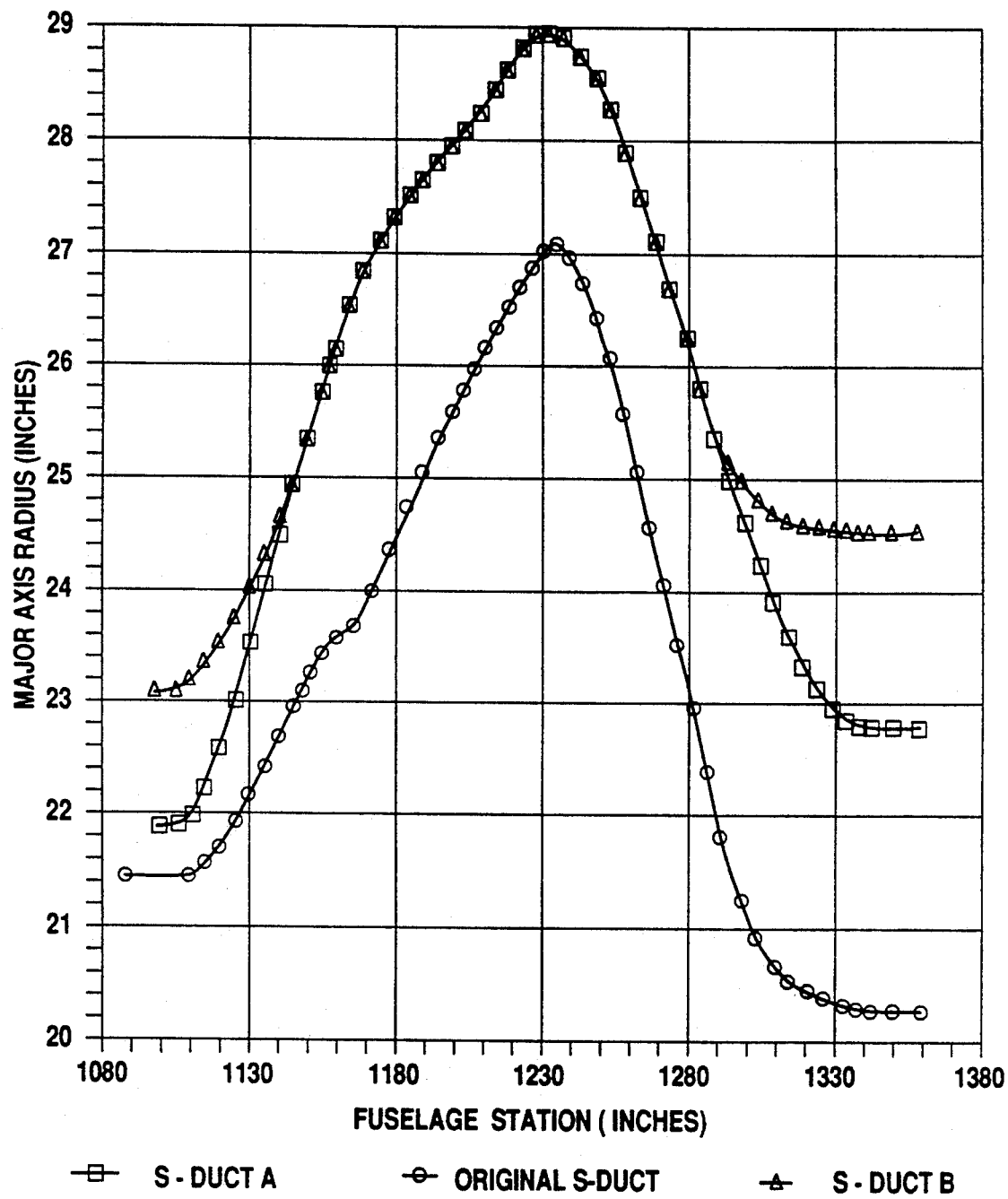
FIG. 6 is a graph showing the major axis of the new S-duct and the original S-duct construction.

FIG. 3 illustrates S-duct A, designed for the Tay 650 engine, S-duct B designed for the Tay 670 engine, and the prior art S-duct designed for the JT8D engine. The relative position of the open inlet end 10a to the engine's horizontal axis 14a (FIG. 2) is approximatley the same for S-duct A or S-duct B. The S-shaped portion shown generally at 10c has a cross-sectional area of both S-duct A and S-duct B (FIG. 4) are defined by an elliptical equation. The elliptical equation used in constructing the present invention has a major axis (FIG. 6) and a minor axis (FIG. 5). Combining the plurality of dimensions of those two axis into an elliptical equation results in the S-duct having a relatively circular cross-sectional area (FIG. 4) at the air inlet end 10a and, air exit 10b on FIG. 2, an increasing cross-sectional area at the first transitional portion 16 on FIG. 4, an elliptical cross-sectional area shown generally at 18, and a second transitional portion shown generally at 20. The graph of FIG. 4 also illustrates the dramatic differences in cross-section area between the present invention and original S-duct.

FIG. 3 illustrates a comparison between the present invention as it is implemented to accommodate the Tay 650 engine 24, the Tay 670 engines 23, with the original S-duct 22. As illustrated the present invention allows a larger cross-sectional duct area then the original S-duct while meeting all of the aircraft's structural limitations.

The structural limitations imposed on the present invention 10 are: the S-duct must unobstructively traverse the front pressure bulkhead 27; pass through the aperture of the main spar forging of the vertical fin 26; and maintain the approximate upper surface waterline 22a of the original S-duct. The horizontal center line at the exit end of the duct of the Tay 650 and Tay 670 engines are 24a and 23a respectfully. The Tay series engines require a minimum of 30% more air than the original S-duct. As illustrated, the present invention accomplishes the higher airflow requirement without a 30% increase in fuselage structural constraint.

The inlet end of the present invention 10a and the air exiting 10b are connected by a S-shaped medial portion 10c. This is illustrated generally in FIGS. 1, 2, and 3. These figures are a profile view of the present invention. To fully describe the present invention, the dimensions of the elliptical portions of the S-duct are set forth in FIGS. 4, 5 & 6.

Figure 7:
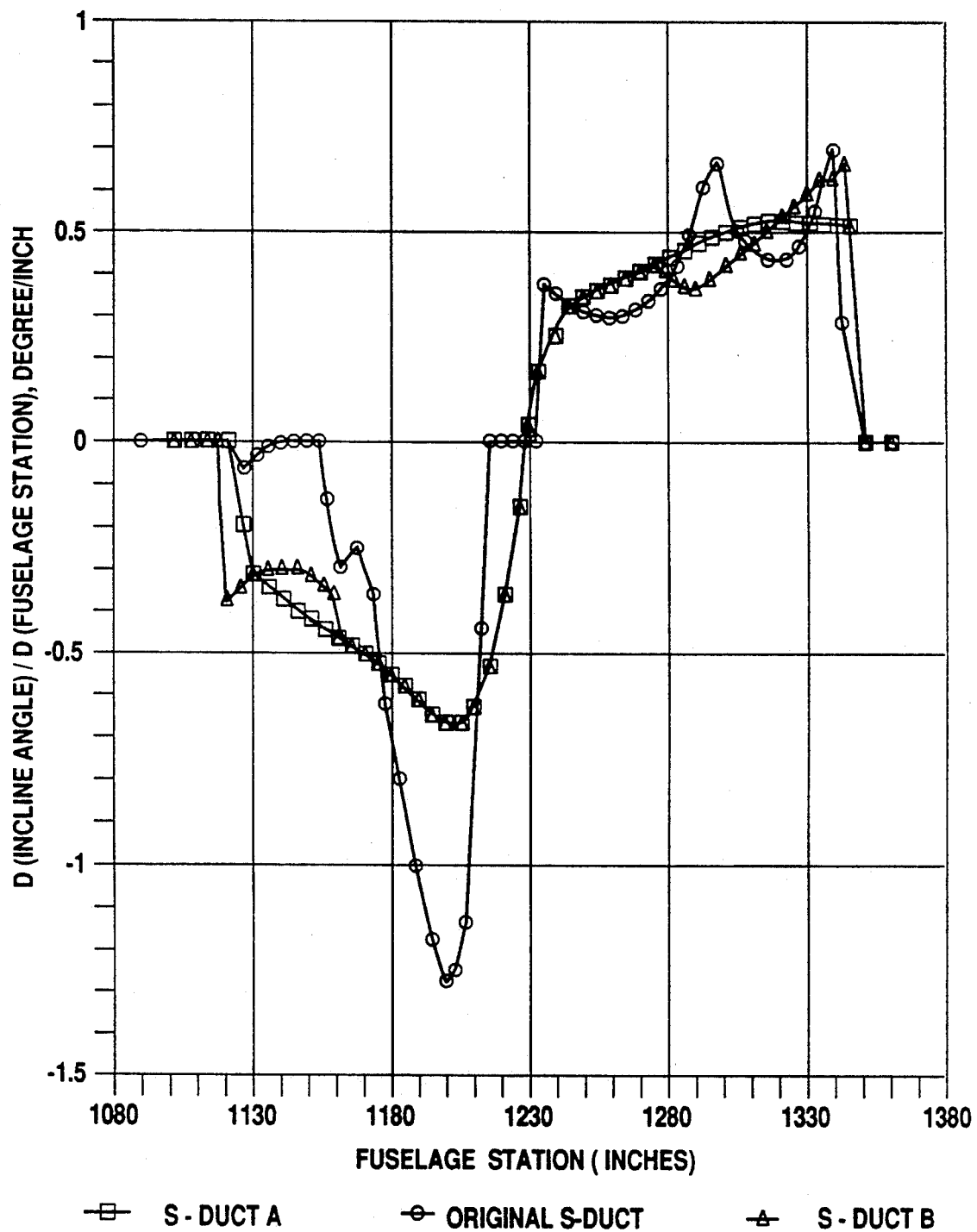
FIG. 7 is a graph of the new S-duct's degree of inclination and the original S-duct construction.

FIG. 7 is a graph of S-duct A, S-duct B, and the prior art rate of change in the inclination angle of the S-ducts centerline 14a versus fuselage station, measured in-change in degrees per inch.

Figure 8:
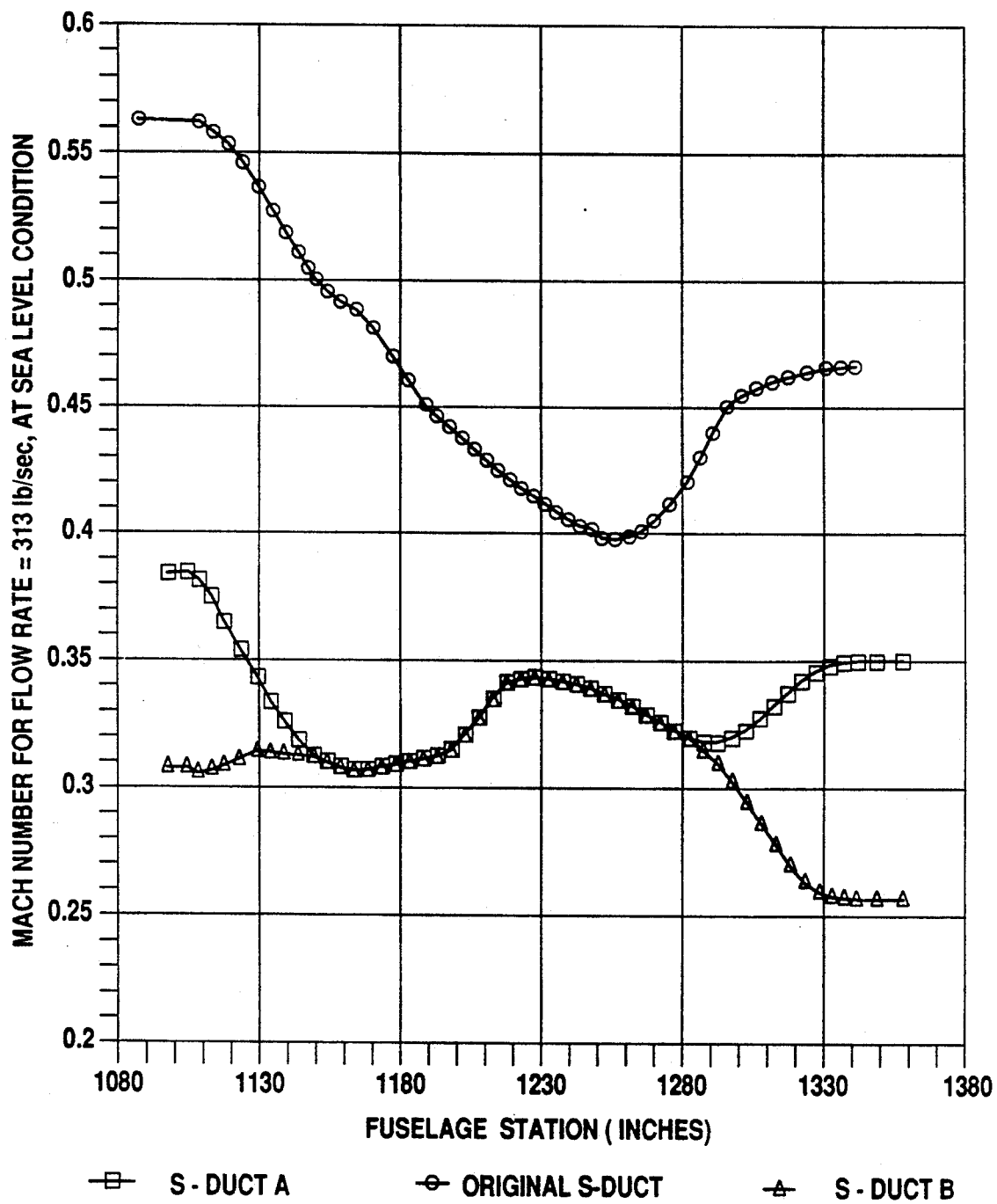
FIG. 8 is a graph showing Mach number flow of the new S-duct and Mach number flow of the original S-duct construction.

The Mach number profile FIG. 8 is the velocity of the air flow along the longitudinal center line of S-duct A, S-duct B and the original S-duct from the air inlet 10a to the air exit 10b into the engine fan.

This profile taken in view of the varying cross-sectional area of the S-duct, the rate of change in inclination angle of FIG. 7 relative to the S-duct, will produce a pressure recovery ratio of greater than 0.98. This ratio is the measurement of the air pressure at duct exit 10b versus the air pressure at duct inlet 10a.

The total air pressure at 10b must be relatively the same air pressure found at 10a even with the many environmental restrictions found within an aircraft fuselage. An example of these restrictions are found on the Boeing 727 aircraft. Wherein, the S-duct 10 must traverse the cabin rear pressure bulk head 27 and pass through the main spar forging of the vertical fin 26 on its way to the turbo jet engine 14.

It can readily be determined by those skilled in the art that the original S-duct by Boeing had decelerating flow at the point of maximum curvature in the first bend. The S-duct of the present invention accelerates flow during the maximum curve of the first bend of the S-duct. The original S-duct, in an attempt to maintain attached flow, decelerated the flow around the maximum curve of the first bend, creating an adverse pressure gradient. This resulted in the requirement to install vortex generators to maintain attached flow with their attendent drag increase. The accelerating flow around the major part of the first bend embodied in the present invention creates a favorable pressure gradient eliminating the need for a vortex generators and therefore maintains higher energy across the entire flow path.

The invention now being fully described, it will be apparent to one of ordinary skill in the art that many changes and modifications can be made thereto without departing from the spirit or scope of the invention as set forth herein.

We claim:

1. A replacement duct to direct air to a turbo jet type aircraft engine disposed within the aft body portion of an existing aircraft fuselage at a position rearwardly of a rear pressure bulkhead and below and behind a vertical tail fin spar having an aperture therethrough for receiving the original S-duct of the drawings comprising;

a forward duct portion having an air entering circular open inlet end disposed forwardly of said vertical tail fin spar and disposed above said aft body portion and said rear pressure bulkhead of the aircraft fuselage;

a rear duct portion having a circular end sealingly connectable to the air input end of said turbo jet aircraft engine;

an S-shaped intermediate duct portion interconnecting said forward duct portion and said rear duct portion and passing above said rear pressure bulkhead and traversing said aperture in said tail vertical fin spar; said intermediate duct portion having an elliptical cross-section of varying area through out its length;

said forward end portion having a cross-section transitioning from a circular cross-section of substantially greater area than that of the original S-duct of the drawings, to the elliptical cross-section of said intermediate duct portion;

said rear duct portion having a cross-section transitioning from the elliptical cross-section of said intermediate duct portion to a circular cross-section of substantially greater area than the original S-duct, thereby permitting installation of a turbo jet engine with a substantially larger air intake diameter;

said intermediate S-shaped duct portion having a medial elliptical portion traversing and constricted by said aperture of said tail vertical fin spar, the remaining portions of said intermediate duct portion having elliptical cross-sections of substantially greater area than the medial elliptical portion and the original S-duct of the drawings;

the radius of curvature of the forward curved portion of said S-shaped intermediate duct portion being greater than the corresponding radius of the original S-duct of the drawings; and the axis of said circular open end of said forward duct portion being vertically displaced upwardly relative to the axis of the turbo jet engine, whereby a greater volume of air per unit of time is supplied to the turbo jet engine without creating low total pressure regions in the air stream at the engine inlet fan than was possible with the original S-duct of the drawings.

2. The apparatus of claim 1 wherein the existing aircraft is a Boeing 727; and the major axis of the elliptical portions of said replacement duct vary as a function of the length of the replacement duct as shown in S-duct A; and the minor axis of the elliptical portions of said replacement duct vary as a function of the length of the replacement duct as shown in S-duct A.

3. A duct to ingest air for a turbo jet engine disposed within the aft body portion of an aircraft fuselage; above an aft rear pressure bulkhead; and passing through an aperture in a main spar forging of the vertical tail fin, comprising:

a forward duct portion having an air entering open end disposed forward of said vertical tail fin spar and disposed above said aft body portion of the aircraft;

said duct having an air exiting aft portion sealingly connectable to the input end of the turbo jet aircraft engine;

said duct's open end having its axis substantially above and forward of said air exiting aft portion;

an S-shaped medial duct portion connecting said air entering open end to said air exiting end;

said duct's medial portion having an elliptical cross-sectional area defined according to S-duct A of the drawings; and said duct's elliptical cross-sectional area having a major axis defined according to S-duct A of the drawings and a minor axis defined according to S-duct A of the drawings.

4. A duct to ingest subsonic air for an turbo jet aircraft engine air inlet comprising:

a plurality of adjacently attached duct sections having an air intake first duct section;

said air intake duct section having a circular cross-sectional area air flow communications opening;

said air intake duct section positioned vertically above the horizontal axis of the turbo jet aircraft engine;

said air intake duct section having an opening not less then 1400 in$^2$ nor more than 1750 in$^2$ a first transitional duct section transitioning from a circular to an elliptical cross-section;

said first transitional duct section having a first bend in the range of 0.5 degrees per inch for turning ingested subsonic air;

an intermediate duct section positioned rearwardly adjacent to said first transitional duct section and having a reduced elliptical cross-sectional area;

a second transitional duct section being positioned rearwardly adjacent to said intermediate duct section said second transitional duct transitioning from an elliptical to a circular cross-section and having a second bend in the range of 0.5 degrees per inch for turning subsonic air; and the circular end of said second transitional duct being attached to the turbo jet aircraft engine's air inlet.

5. In a turbo fan jet engine aircraft having one engine mounted in the aft section of the aircraft adjacent to the main spar forging of the vertical fin located aft the rear cabin pressure bulkhead, wherein the subsonic air inlet is located vertically above the horizontal axis of the engine, the improvement comprising:

an elongated air induction duct of claim 4 positioned with said first transitional duct section unobstructedly overlying the aft section rear pressure bulkhead; and said intermediate duct section unobstructively passing through the main spar forging of the vertical fin of the aircraft.

6. A duct to ingest air for a turbo jet engine disposed within the aft body portion of an aircraft fuselage; above an aft rear pressure bulkhead; and passing through an aperture in a main spar forging of the vertical tail fin, comprising:

a forward duct portion having an air entering open end disposed forward of said vertical tail fin spar and disposed above said aft body portion of the aircraft;

said duct having an air exiting aft portion sealingly connectable to the input end of the turbo jet aircraft engine;

said duct's open end having its axis substantially above and forward of said air exiting aft portion;

an S-shaped medial duct portion connecting said air entering open end to said air exiting end;

said duct's medial portion having an elliptical cross-sectional area defined according to S-duct B of the drawings; and said duct's elliptical cross-sectional area having a major axis defined according to S-duct B of the drawings and a minor axis defined according to S-duct B of the drawings.

7. An S-duct to ingest air at a relative constant air pressure recovery ratio for a turbo jet engine disposed within the aft body portion of an aircraft fuselage and having a forwardly facing engine air inlet opening; above an aft rear pressure bulkhead; and passing through an aperture in a main spar forging of the vertical tail fin; comprising:

a forward duct portion having an air entering elliptically shaped inlet and an elliptically shaped air exiting outlet;

said forward duct portion being disposed forward of said vertical tail fin spar and above said aft body portion of the aircraft;

said forward duct having a cross section area of about 1500 sq. in.;

said forward duct's cross-sectional area having substantially equal elliptical major and minor axis of about 21.8 in.;

an aft duct portion having an air entering elliptically shaped inlet and an air exiting elliptically shaped outlet;

said aft duct portion being disposed aft of said vertical tail fin spar, below and substantially aft of said forward duct's inlet center line axis, said aft duct's outlet being sealingly connected to the air inlet opening of the turbo jet engine;

said aft duct having a cross-section area of about 1620 sq. in.;

said aft duct's cross-sectional area having substantially equal elliptical major and minor axis of about 22.8 in.;

an S-shaped medial duct portion having a leading transitional bend portion contoured to engage said forward duct's air exiting outlet and a trailing transitional bend portion contoured to engage said aft duct's air entering inlet, said medial duct passing through the aperture in the main spar forging of the vertical tail fin;

said leading bend having an increasing cross-sectional area in the range of about 1500 sq. in. to 1780 sq. in. and a radius of curvature in the range of about 0.5 deg./in.;

said medial duct's leading bend cross-sectional area having an elliptical increasing major axis in the range of about 21.8 to 25.2 in. and a increasing minor axis in the range of about 21.8 to 22.6 in.;

said medial duct's trailing bend having a decreasing cross-sectional area in the range of about 1760 sq. in. to 1620 sq. in. and a radius of curvature in the range of about 0.5 deg./in.;

said medial duct's trailing bend cross-sectional area having an elliptical decreasing major axis in the range of about 25.2 in. to 22.8 in. and a relative constant minor axis in the range of about 22.6 in.;

whereby air entering said forward duct's inlet will be turned by said medial duct and exit through said aft duct's outlet into said turbo jet engine face at a relative constant air pressure recovery ratio of at least 0.98.

8. An S-duct to ingest air at a relative constant air pressure recovery ratio for a turbo jet engine disposed within the aft body portion of an aircraft fuselage and having a forwardly facing engine air inlet opening; above an aft rear pressure bulkhead; and passing through an aperture in a main spar forging of the vertical tail fin; comprising:

a forward duct portion having an air entering elliptically shaped inlet and an elliptically shaped air exiting outlet said forward duct disposed forward of said vertical tail fin spar and disposed above said aft body portion of the aircraft;

said forward duct having a cross-section area of about 1680 sq. in.;

said forward duct's cross-sectional area having substantially equal elliptical major and minor axis of about 23.1 in.;

an aft duct portion having an air entering elliptically shaped inlet and an air exiting elliptically shaped outlet;

said aft duct portion being disposed aft of said vertical tail fin spar, below and substantially aft of said forward duct's inlet center line axis, said aft duct's outlet being sealingly connected to the air inlet opening of the turbo jet engine;

said aft duct having a cross-section area of about 1880 sq. in.;

said aft duct's cross-sectional area having substantially equal elliptical major and minor axis of about 24.6 in.;

an S-shaped medial duct portion having a leading transitional bend portion contoured to engage said forward duct's air exiting outlet and a trailing transitional bend portion contoured to engage said aft duct's air entering inlet, said medial duct passing through the aperture in the main spar forging of the vertical tail fin;

said leading bend having an increasing cross-sectional area in the range of about 1680 sq. in. to 1780 sq. in. and a radius of curvature in the range of about 0.5 deg./in.;

said medial duct's leading bend cross-sectional area having an elliptical increasing major axis in the range of about 23.1 to 25.2 in. and a decreasing minor axis in the range of about 23.1 to 22.6 in.;

said medial duct's trailing bend cross-sectional area having an elliptical decreasing major axis in the range of about 25.2 in. to 24.8 in. and a relative constant minor axis in the range of about 0.5 deg./in.;

whereby air entering said forward duct's inlet will be turned by said medial duct and exit through said aft duct's outlet into said turbo jet engine face at a relative constant air pressure recovery ratio of at least 0.98.

* * * * *